3,018,162
ANHYDROUS METAL FLUOBORATES
Harold S. Halbedel, Euclid, and Walter B. Field, Cleveland, Ohio, assignors to The Harshaw Chemical Company, Cleveland, Ohio, a corporation of Ohio
Filed Apr. 15, 1960, Ser. No. 22,447
6 Claims. (Cl. 23—59)

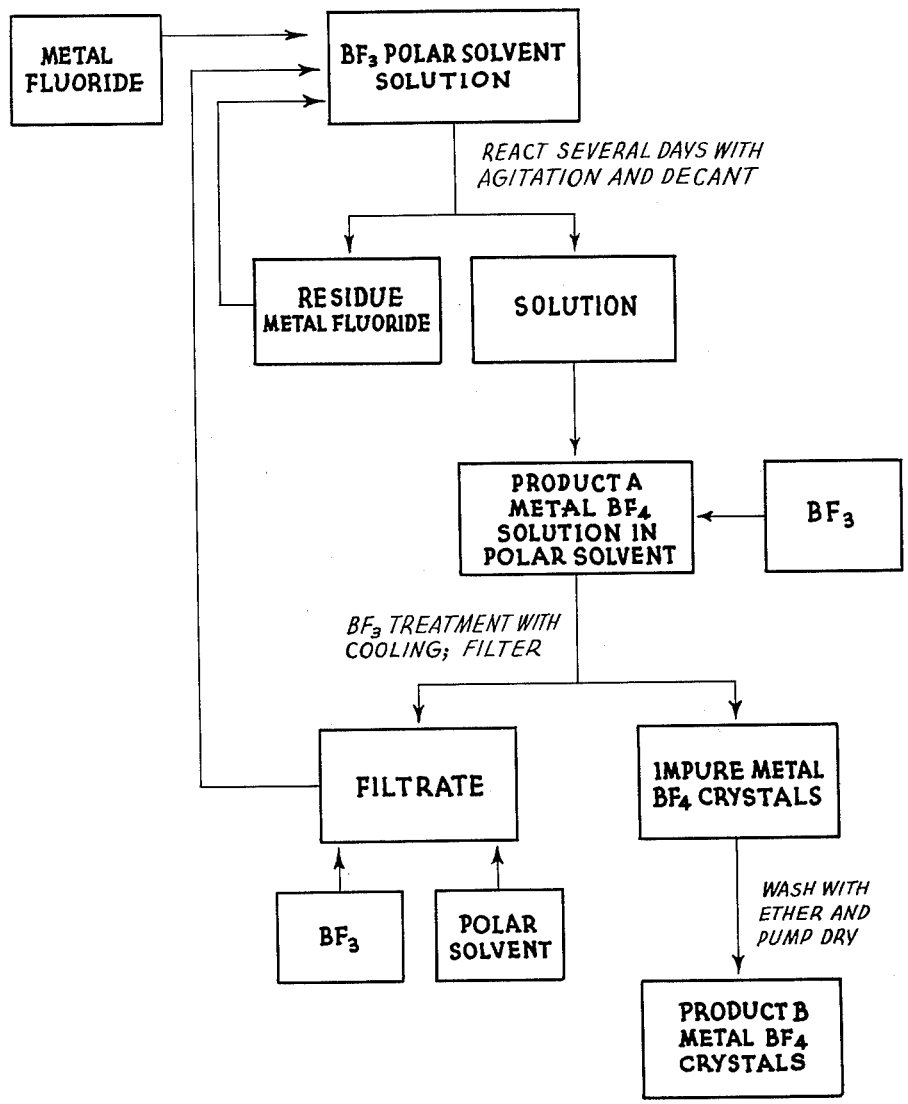
HAROLD S. HALBEDEL & WALTER B. FIELD, INVENTORS.

This invention relates to anhydrous metal fluoborates and to the methods of their preparation.

Metal fluoborates have found application as curing catalysts for various resins, such as, for instance, epoxy resins, and for electroplating bath addition agents. The curing of epoxy resins, however, frequently takes place in a volatile organic solvent wherein the presence of water and particularly the presence of water in the curing catalyst is undesirable. Fluoborates of lead, tin, cadmium, iron, indium, nickel and silver are valuable salts in plating baths and are commonly sold in solution form as 50% concentration. The shipping and packaging of such solutions, however, is a major problem which could be eliminated by the preparation of fluoborates in anhydrous form.

Most fluoborates as commonly prepared contain a certain amount of water of hydration. The better known methods of preparation are: (a) the reaction of boron trifluoride with heated fluorides of certain metals; and (b) the reaction of fluoboric acid with a halide, oxide, hydroxide, carbonate, nitrate or sulfate of a metal. In general, fluoborates of group III–B metals and the alkali metals, with the exception of lithium, are readily dehydrated by warming or the use of desiccants. Other fluoborates and more specifically the fluoborates of lithium, groups I–B, II–B, III, IV–B, transition metals and alkaline earth metals are strongly coupled to their waters of hydration. Various attempts have been made to remove the strongly coupled water of hydration which is found in certain metal fluoborate crystals. When a simple application of heat is employed, it is found that these metal fluoborate crystals lose water at about 40° C. to 60° C. However, the metal fluoborate is also subjected to a decomposition process wherein there is a reversion to boron fluoride and metal fluoride. Attempts have also been made to remove the water of hydration by an azeotropic distillation process. The azeotropic distillation process employed benzene as the immiscible liquid. The procedure did remove the bulk of water, but complete dehydration could not be effected. Continued distillation merely resulted in decomposition of the meal fluoborate.

Metal fluoborates which contain the $BF_4$ radical and liberate the $BF_4^-$ ion in solution should not be confused with metal fluoride-$BF_3$ complexes. Anhydrous metal fluoride-$BF_3$ complexes may be formed by the addition of a metal fluoride to an ether-boron trifluoride complex, followed by liberation of ether. Fluoborates in comparison with corresponding anhydrous metal fluoride-$BF_3$ complexes are generally superior for use as curing catalysts or as salts in plating baths. The metal fluoride-$BF_3$ complexes are unsuitable in that many of them break down at room temperature, liberating $BF_3$ and also in that metal fluoride-$BF_3$ complexes form metal fluorides when placed in water, the metal fluorides being of no use in plating.

It is, therefore, an object of this invention to produce a method for the preparation of anhydrous metal fluoborates.

It is a further object of this invention to produce non-aqueous solvated metal fluoborates.

It is another object of this invention to produce a solution of anhydrous metal fluoborate in an organic solvent.

We have now discovered that it is possible to produce anhydrous metal fluoborates by the addition of a metal fluoride to a solution of boron trifluoride in an oxygen containing polar solvent which is not subject to a breakdown, agitating the resultant solution, treating the solution with additional boron trifluoride, preferably diluted with small amounts of inert gas and recovering resultant anhydrous metal fluoborate crystals. The anhydrous metal fluoborate crystals are found to be crystals of the solvated type, that is, their crystalline structure has a polar solvent rather than water coupled therein.

If a solution of anhydrous meal fluoborate is desired, the above procedure may be modified by elimination of the $BF_3$ crystallization addition step. The resultant metal fluoborate solution may be packaged for use as a resin curing catalyst.

A better understanding of the general type of applicants' procedure may be obtained from the accompanying flow sheet. The flow sheet shows the addition of a metal fluoride to a $BF_3$ polar solvent solution. The concentration of $BF_3$ may be in the range of from 5% to 50%; the preferred range being from 15% to 40%. The resultant mixture is then reacted for two or more days with agitation and then decanted. The residue which is primarily metal fluoride or metal fluoride-$BF_3$ complex may be recycled to the $BF_3$ polar solvent solution. The resultant solution, which is designated on the flow sheet as Product A, may be drawn off and packaged for use as a resin curing agent. This product is particularly useful where a slight excess of $BF_3$ is not undesirable in the end use. As an alternate to the packaging of the product at this point, the solution which consists of a metal fluoborate in a $BF_3$ polar solvent solution may be drawn off and the $BF_3$ concentration slowly increased with cooling to about 15% to 40% of $BF_3$ in polar solvent, the amount of $BF_3$ added being that which will produce maximum precipitation. The solution, thus treated, is then filtered. The filtrate from this operation with the addition of $BF_3$ and polar solvent may be recycled to the initial $BF_3$ polar solvent solution. Crystals recovered from the filtration operation are impure metal fluoborate crystals which are washed with ether and pump dried to obtain purified metal fluoborate crystals, designated as Product B on the flow sheet.

The reaction which takes place may be written as follows:

$$MF_n + nR + nBF_3 \rightleftharpoons M(BF_4)_n + nR$$

where M is a metal selected from the group consisting of lithium, I–B, II–B, III, IV–B, alkaline earth metals and transition metals, R is an oxygen containing polar solvent preferably selected from the group consisting of methanol and ethanol, and $n$ is an integer equal to the valence of the metal M.

The method of preparation of this invention is dependent upon the discovery that fluoborates result from the dissolution of metallic fluorides in coordination complexes of $BF_3$, provided the bond strength of the solvent $BF_3$ complex is less than the bond strength of the desired fluoborate. To a degree this principle was recognized by the teachings of the prior art. However, the only apparent use which was made of this principle was to separate water or ethers from their respective complexes with $BF_3$ in order to form metal fluoride-$BF_3$ complexes. In contradistinction to this procedure, applicants' invention is carried out by employing an organic complexing medium which is also a solvent for the desired fluoborate. Applicants are therefore able to form, by means of the controlled addition of $BF_3$, a crystallized meallic compound containing $BF_4$ radical.

The procedure of this invention necessitates a polar solvent which will not break down to form dehydration products and which has some degree of solubility for the metal fluoborate formed. The term solvent as used herein is synonymous with the term coordinating agent, that is, the solvent for the metal fluoborate is also that compound which forms a coordination compound with $BF_3$. Some solvents which are suitable for the purposes of this invention are methanol and ethanol, methanol being preferred because it is a better solvent for metal fluoborates.

Specific examples of the preparation of anhydrous metal fluoborates according to this invention are as follows:

Example I 393 grams of $BF_3$ were added to 690 grams of methanol in a 2-liter three-neck flask over a 1½ hour period. An ice water bath was used to take off the heat of reaction. One-half of the resulting solution was placed in each of two 1-liter Erlenmeyer flasks containing 150 grams of $ZnF_2$. The flasks were stoppered and placed on an Eberbach shaker. Alcohol was added after shaking one day to a total of 1090 grams of alcohol (including original alcohol) for dissolution of zinc fluoborate crystals and to enable good mixing. This was equivalent to a 36% solution of $BF_3$ (plus $BF_4$ as $BF_3$) in alcohol. The solutions were allowed to settle 3 hours and the milky liquors decanted into a dry 2-liter three-neck flask in an ice water bath. 60 grams of alcohol insoluble $ZnF_2$ were recovered from the flasks. A small flow of nitrogen was fed into the flask and $BF_3$ impinged slowly on the surface of the liquor while stirring slowly. 150 grams of $BF_3$ were added over 1½ hours. This produced an equivalent of 17% $BF_3$ in the $BF_3$-alcohol (alcohol tied up in the solvated crystals included). The crystals were filtered on a Büchner funnel, washed with two 100 ml. portions of ether and pump-dried 4 hours to very slight loss in weight. 57.3 grams of very hygroscopic solvated zinc fluoborate crystals were obtained. A higher yield could have been obtained upon further addition of $BF_3$ to about 25% $BF_3$ in $BF_3$-alocohl. A large excess of $BF_3$, however, was added to the liquor, thus dissolving the crystals.

Example II 100 grams of $BaF_2$ and 232 grams of $CH_3OH$-$BF_3$ solution (33.3% $BF_3$) were placed in a one-liter Erlenmeyer flask. 249 grams of $CH_3O$ were added. The flask as stoppered and shaken for 3 days. The flask was allowed to stand, the solution decanted into a one-liter three-neck flask in a cold water bath. $BaF_2$ in the residue was 8.0 grams. 215 grams of $BF_3$ diluted by a small flow of nitrogen were run in with mild agitation. A large crystalline precipitate was then filtered on a Büchner funnel. The $BF_3$ addition was equivalent to 36% $BF_3$ in $BF_3$-alcohol (alcohol tied up in solvated crystals included). $BF_3$ addition was continued to a total of 310 grams (44% $BF_3$ solution in alcohol on original basis) for maximum precipitation. The salt was washed twice with 100 ml. portion of anhydrous ether and pump-dried.

Example III 300 grams of zinc fluoride were reacted for two days with a solution of 393 grams of $BF_3$ in 1179 grams of methanol (25% $BF_3$-methanol solution) in two one-liter Erlenmeyer flasks. Constant agitation was maintained on an Eberbach shaker. The liquor was decanted into a two-liter three-neck flask in an ice water bath. 28 grams of zinc fluoride residue remained. $BF_3$ diluted by a small amount of nitrogen was slowly added to 390 grams and 324 grams of crystals were filtered off. $BF_3$ addition was continued to 540 grams (total $BF_3$) and 611 grams of crystals separated. The total yield from above being 1001 grams of zinc fluoborate crystals. The crystals were washed well with ether on a Büchner funnel and dried rapidly in a vacuum oven at 40° C. The crystals were removed and packaged rapidly in glass jars with polyethylene liners. Total Zn analysis 14.9% figured to $Zn(BF_4)_2$ is 54.4% by weight of product. This agrees well with $Zn(BF_4)_2.6CH_3OH$, theoretical $Zn(BF_4)_2$ 55.4%.

What we claim is:

1. A process for the preparation of anhydrous zinc fluoborate comprising mixing zinc fluoride with an anhydrous 25% solution of $BF_3$ in methanol, agitating the mixture, removing unreacted metal fluoride, adding additional $BF_3$ diluted by a small flow of nitrogen and filtering off crystals of anhydrous zinc fluoborate.

2. A process for the preparation of an organic solution of anhydrous zinc fluoborate comprising mixing zinc fluoride with an anhydrous 25% solution of $BF_3$ and methanol, agitating the mixture and removing unreacted metal fluoride.

3. A process for the preparation of anhydrous barium fluoborate comprising mixing barium fluoride with an anhydrous 33.3% solution of $BF_3$ in methanol, agitating with additional methanol, removing unreacted metal fluoride, adding additional $BF_3$, and filtering off crystals of anhydrous barium fluoborate.

4. A process for the preparation of a solution of anhydrous barium fluoborate in an anhydrous organic solvent comprising mixing barium fluoride with a 33.3% solution of $BF_3$ in methanol, agitating with additional methanol, and removing unreacted metal fluoride.

5. A process for the preparation of an anhydrous metal fluoborate comprising mixing a metal fluoride selected from the group consisting of zinc fluoride and barium fluoride with a 5% to 50% solution of $BF_3$ in an anhydrous oxygen containing polar solvent, agitating the mixture, removing unreacted meal fluoride, adding additional $BF_3$ and filtering off crystals of anhydrous metal fluoborate.

6. A process for the preparation of a solution of anhydrous metal fluoborate comprising mixing a metal fluoride selected from the group of zinc fluoride and barium fluoride with a 5% to 50% solution of $BF_3$ in an anhydrous oxygen containing polar solvent, agitating the mixture and removing unreacted metal fluoride.

References Cited in the file of this patent

UNITED STATES PATENTS

| | | |
|---|---|---|
| 2,465,989 | Sowa | Apr. 5, 1949 |
| 2,796,323 | Eberle | June 18, 1957 |

FOREIGN PATENTS

| | | |
|---|---|---|
| 814,638 | Great Britain | June 10, 1959 |

OTHER REFERENCES

J. W. Mellor's "A Comprehensive Treatise on Inorg. and Theoretical Chemistry," vol. 5, 1924 Ed., page 123, Longmans, Green and Co., N.Y.

UNITED STATES PATENT OFFICE
CERTIFICATE OF CORRECTION

Patent No. 3,018,162　　　　　　　　　　　　January 23, 1962

Harold S. Halbedel et al.

It is hereby certified that error appears in the above numbered patent requiring correction and that the said Letters Patent should read as corrected below.

Column 2, line 63, for "meallic" read -- metallic --; column 3, line 32, "-alocohl" read -- -alcohol --; line 40, for "$CH_3O$" read -- $CH_3OH$ --; column 4, line 41, for "meal" read -- metal --.

Signed and sealed this 8th day of May 1962.

(SEAL)
Attest:

ERNEST W. SWIDER
Attesting Officer

DAVID L. LADD
Commissioner of Patents